United States Patent
Balderas et al.

(10) Patent No.: US 10,705,896 B2
(45) Date of Patent: Jul. 7, 2020

(54) NORMALIZED APPLICATION PROGRAM INTERFACE TO COMMUNICATE WITH WEB SITE ACCESS CONTROL PORTS

(71) Applicant: ZenBusiness, Austin, TX (US)

(72) Inventors: Carlos Balderas, Austin, TX (US); Rafael Lopez, Austin, TX (US)

(73) Assignee: ZenBusiness, Austin, TX (US)

( * ) Notice: Subject to any disclaimer, the term of this patent is extended or adjusted under 35 U.S.C. 154(b) by 81 days.

(21) Appl. No.: 16/131,828

(22) Filed: Sep. 14, 2018

(65) Prior Publication Data
US 2020/0089551 A1 Mar. 19, 2020

(51) Int. Cl.
*G06F 9/54* (2006.01)
*G06N 20/00* (2019.01)

(52) U.S. Cl.
CPC .............. *G06F 9/547* (2013.01); *G06N 20/00* (2019.01)

(58) Field of Classification Search
CPC .............................. G06N 20/00; G06F 40/174
See application file for complete search history.

(56) References Cited

U.S. PATENT DOCUMENTS

| | | | | |
|---|---|---|---|---|
| 2011/0185273 A1* | 7/2011 | DaCosta | ............... | G06F 9/5038 715/234 |
| 2018/0191764 A1* | 7/2018 | Chawla | ................... | H04L 63/12 |
| 2018/0322418 A1* | 11/2018 | Jayaraman | ............ | G06F 40/174 |
| 2019/0303432 A1* | 10/2019 | Greiner | ................. | G06F 40/174 |
| 2019/0384617 A1* | 12/2019 | Jain | ..................... | G06F 9/44526 |
| 2020/0005080 A1* | 1/2020 | Cogan | .................... | G06N 20/00 |

OTHER PUBLICATIONS

Schrenk, M., "Webbots, Spiders, and Screen Scrapers: A Guide to Developing Internet Agents with PHP/Curl", (2007), No Starch Press Inc., pp. 47-59, 177-186.*

* cited by examiner

*Primary Examiner* — Brian W Wathen
(74) *Attorney, Agent, or Firm* — Rowan TELS LLC

(57) ABSTRACT

A system including at least one server, access operation logic coupled to the server and adapted to communicate signals from the server to a plurality of web site access control ports, each of the web site access control ports comprising an access mechanism for submitting electronic documents to the corresponding web site, wherein the access mechanism varies across different access control ports on different web sites, the access operation logic adapted to receive the electronic documents and an associated web site identification and to select an access protocol to apply to an access mechanism of a particular web site corresponding to the associated web site identification, and the server comprising probe logic adapted to identify the web site access control ports and to apply signals about the web site access control ports through a machine learning component to adapt the access protocol to the access mechanisms of different web sites.

15 Claims, 9 Drawing Sheets

NORMALIZED APPLICATION PROGRAM INTERFACE TO COMMUNICATE WITH WEB SITE ACCESS CONTROL PORTS

BACKGROUND

Web sites often have different web site access control ports with a different access protocol. These access protocols may be difficult to determine, and access attempt may fail due to incorrect formatting or data required. Furthermore, many web site access control ports may have similarities in their access protocols. Efficiency may be gained by not re-performing redundant work.

BRIEF SUMMARY

The present system determines data and requirements to determine the access protocol for web site access control ports. These access protocols are utilized by access operation logic to retrieve require data and structure that data according the access protocol. The system may comprise further logic to operate portal to receive data. The system may also utilize a machine learning component to determine applicability of access protocols to specific data. One specific embodiment is for establishing entities on the web site of the Secretary of State (SOS) for a state. The data input mechanism may be normalized across the 50 states, while additional logic is utilized to transform the data into an access mechanism for the web site access control ports of the SOS sites.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
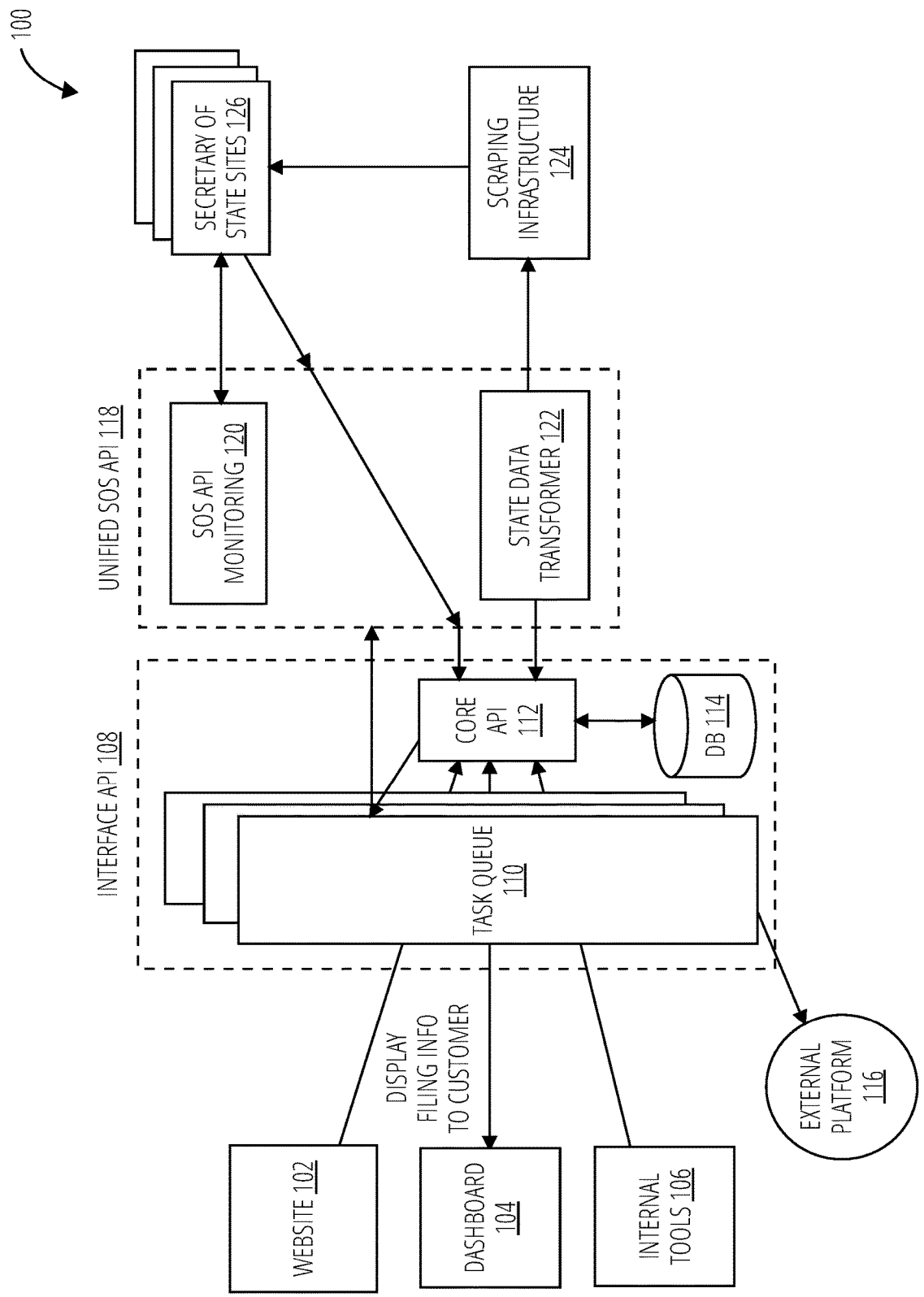
FIG. 1 illustrates an embodiment of a system 100.

Referring to FIG. 1, a system 100 in one embodiment comprises a website 102, a dashboard 104, internal tools 106, an interface API 108, a task queue 110, a core API 112, a control memory structure 114, an external platform 116, a unified SOS API 118, an SOS API monitoring 120, a state data transformer 122, a scraping infrastructure 124, and Secretary of State sites 126. The system 100 may be utilized to interact with the Secretary of State sites 126. However, other embodiments of the system 100, may interact with web site access control ports for other different web sites.

The website 102, the dashboard 104, and the internal tools 106 are utilized to interact with the interface API 108. The website 102, the dashboard 104, and the internal tools 106 may be utilized to provide information to the interface API 108, which may then be utilized to interact with the Secretary of State sites 126. The dashboard 104 may include an interactive user interface that is configured by the interface API 108 to receive information.

The interface API 108 comprises the task queue 110, the core API 112, and the control memory structure 114. The task queue 110 receives the interactions from the website 102, the dashboard 104, and the internal tools 106 and prioritizes sending those interactions to the core API 112. The task queue 110 also receives tasks from the core API 112 and prioritizes sending these tasks to the dashboard 104, the external platform 116, and the unified SOS API 118.

The core API 112 receives the interactions and determines whether relevant information is stored within the control memory structure 114. The core API 112 may also store any received new information in the control memory structure 114. The information may be stored in a standard format to be displayed on a user interface. The standard format may be associated with a number of specific formats. The specific formats may be utilized by the state data transformer 122 to generate the access protocol. For example, one standard format may be "entity name". This standard format may be associated with "company name", "name of corporation", etc. Each standard format thus has multiple branches of associated specific formats. These may then be utilized if the one of the Secretary of State sites 126 alters its access mechanism or if the information is utilized at another one of the Secretary of State sites 126. The system 100 may determine the specific formats for each of the Secretary of State sites 126, select a standard format to store (which may be one of the specific formats, such as the most utilized), and associate each of the specific formats with the standard format. The core API 112 sends the information in a standard format to the unified SOS API 118 to be altered into a specific format, prior to being sent to the particular web site of the Secretary of State sites 126. The core API 112 may receive the feedback from the state data transformer 122 or the Secretary of State sites 126. The core API 112 may determine whether the control memory structure 114 comprises the information requested in the feedback from the state data transformer 122 or the Secretary of State sites 126. The core API 112 (via the task queue 110) may then configure the dashboard 104 to display the results and request additional information.

The control memory structure 114 stores data received from the website 102, the dashboard 104, the internal tools 106, the state data transformer 122, and the Secretary of State sites 126. Each client and entity may have information stored, updated, and added to modify the control memory structure 114. This information is selected by the core API 112.

The external platform 116 may receive controls from the task queue 110. The external platform 116 may be an interface for case management and task management, such as Salesforce®. The external platform 116 may interface with the interface API 108 to determine the information that is sent to the external platform 116.

The unified SOS API 118 comprises the SOS API monitoring 120 and the state data transformer 122. The SOS API monitoring 120 may comprise probe logic adapted to identify the web site access control ports and to apply signals about the web site access control ports through a machine learning component to adapt the access protocol to the access mechanisms of different web sites. The access mechanisms may comprise a set of fields (or elements) in a structure, each field to receive a specifically formatted information. An exemplary structure may be 'Field A="corporate name"; Field B="filer name"; and Field C="address of filer"'. The access mechanisms may be identified utilizing the Hypertext Markup Language (HTML) or other markup language of each of the different web sites. These may be stored in a cache and utilized to generate the access protocols along with the standard formatted information. A machine learning component may be utilized to adapt an access protocol when an access mechanism is altered. The system 100 may determine that the access mechanism is altered when an access protocol fails to access the specific web site access control ports, in response to probe logic, etc. The machine learning component may determine the differences between the cached version of the access mechanism and the new access mechanism, which may be determined from the new markup language of the particular web site. The differences may include adding a field ('Field A="corporate name"; Filed B="filer name"; Field C="address of filer"; and Field D="address of corporation"'), removing a field ('Field A="corporate name"; and Field B="filer name"'), shifting fields ('Field A="filer name"; Field B="address of filer"; and Field C="corporate name"'), altering a specific format of information 'Field A="entity name"; Field B="filer name"; and Field C="address of filer"'), etc. Each change may alter the access protocol for the particular web site, as well as information requested from the interface API 108. For an added field, the SOS API monitoring 120 may request further information from the interface API 108, which may then determine whether that information is stored, such as being the standard format or one of its associated formats. The interface API 108 may also then configure a user interface to receive the requested information. For removal of a field, the access protocol may be adapted to not provide information for that field. For shifting fields, the access protocol may be adapted to the new structure to align the information correctly. For an alteration to the specific format of information, the SOS API monitoring 120 may utilize the interface API 108 to determine whether the new format is an associated format to the standard format (or the standard format itself) or whether the new specific format is requesting different information. For example, 'Field A="date of formation"'. The new access mechanism would then be cached, and the unified SOS API 118 would request different information from the interface API 108. The determined access protocol and access mechanism may be utilized to adapt the scraping infrastructure 124. The SOS API monitoring 120 also detects when there are changes to the requirement for the Secretary of State sites 126. The SOS API monitoring 120 then sends a control to the interface API 108 to send the information to the Secretary of State sites 126, which may be currently stored in the control memory structure 114 or may be retrieved via a data submission to the dashboard 104 configured by the core API 112.

The state data transformer 122 receives the standard formatted data, transforms that data into the specific format for the particular web site of the Secretary of State sites 126, and sends a submission to that particular web site. The submission may be an electronic document. The electronic document may have a specific structure for each particular web site. The data is then input into this specific structure to be utilized as part of an access protocol. Multiple electronic documents may have a generalized structure. The generalized structure may be combined with the data and transformed into the specific structure. The state data transformer 122 may send a request for additional information to the interface API 108 during the transformation process if a requirement is not met or data is missing.

The scraping infrastructure 124 may have access operation logic to communicate signals from a server to a plurality of web site access control ports, such as the Secretary of State sites 126. The scraping infrastructure 124 selects the access mechanism for the particular web site, which varies across different access control ports on different web sites. The scraping infrastructure 124 may be adapted by the probe logic to interface with a particular web site that has been changed to require a new access mechanism.

The Secretary of State sites 126 may have specific access mechanisms that differ based on the different web sites. The access mechanism may be determined by probe logic and adapted by access operation logic to interact with the Secretary of State sites 126. In some embodiments, the system 100 may be applied beyond the Secretary of State sites 126 to a plurality of web site access control ports.

Figure 2:
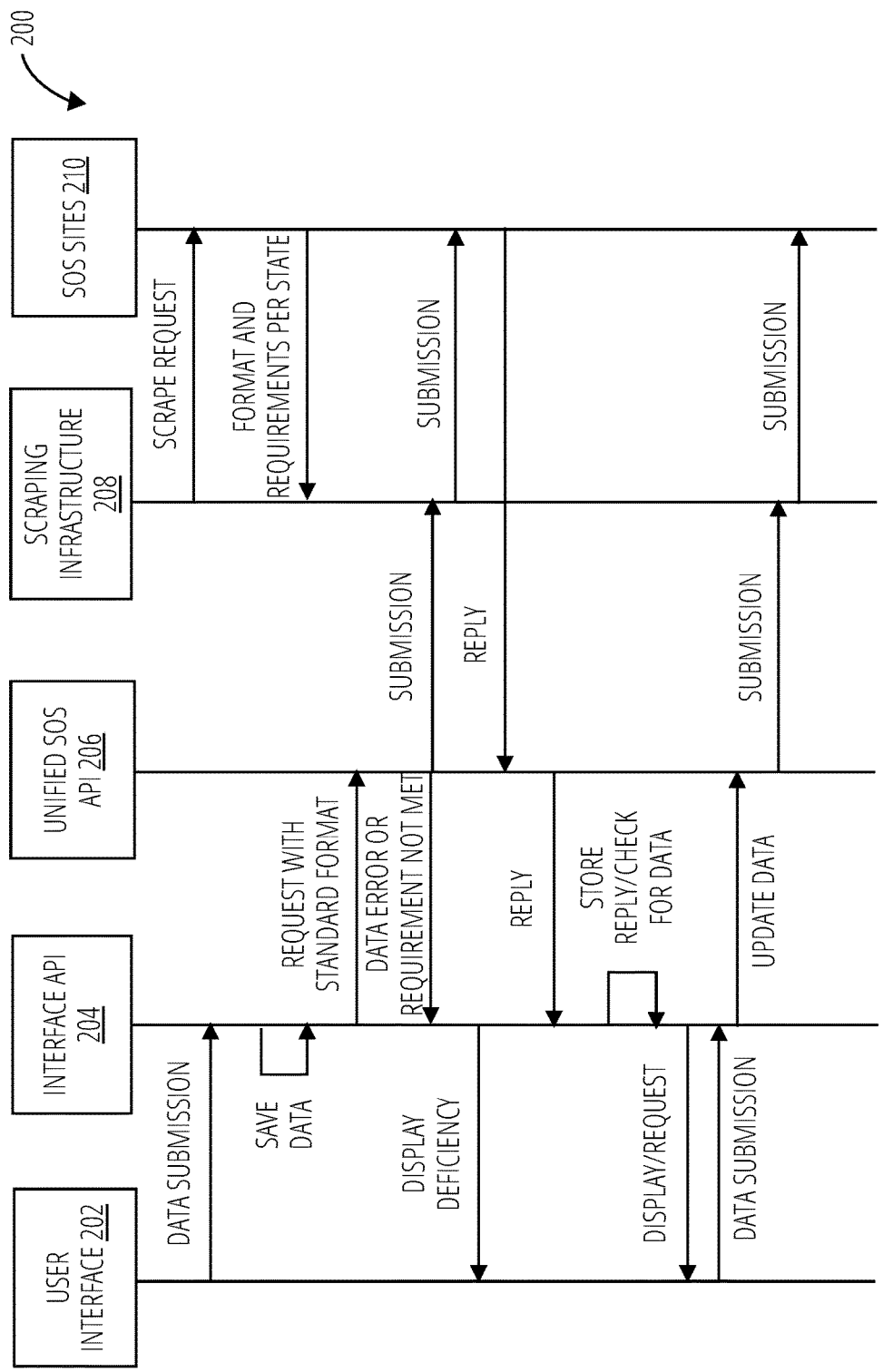
FIG. 2 illustrates an embodiment of a sequence for a data submission 200.

Referring to FIG. 2, an exemplary sequence for a data submission 200 comprises a user interface 202, an interface API 204, a unified SOS API 206, a scraping infrastructure 208, and an SOS sites 210.

The user interface 202 sends a data submission to the interface API 204. Before during or after the data submission, the scraping infrastructure 208 sends a scrape request to the SOS sites 210. The request is to determine the access protocols for the access control ports. The SOS sites 210 then sends the access protocols, such as requirements and data to be requested. The interface API 204 stores the data from the data submission and sends a standard formatted request to the unified SOS API 206. The unified SOS API 206 then determines if the requirements are met. If not, a notification is sent to the interface API 204, and the user interface 202 may be altered by the interface API 204 to display the deficiency and to request and receive additional data.

If the requirements are met, the unified SOS API 206 sends the submission to the scraping infrastructure 208, which may use access operation logic to send the submission to the particular web site of the SOS sites 210. The SOS sites 210 sends a reply to the unified SOS API 206. The unified SOS API 206 may utilize a machine learning component to alter its transformation for the particular web site. The unified SOS API 206 sends the reply to the interface API 204. The interface API 204 may store the reply and check a control memory structure for the data. The interface API 204 may utilize the stored standard and associated formats to determine whether the information is stored. The interface API 204 may utilize word clustering logic to determine that the data is stored.

If the data is not stored, a request is sent to the user interface 202, which may configure the user interface 202 to receive the requested data. Once the additional data is either determined to be stored or received from the user interface 202, the updated data is sent to the unified SOS API 206, which re-transforms the data and re-send the submission to the SOS sites 210 via the scraping infrastructure 208 utilizing the new data or access mechanism.

Figure 3:
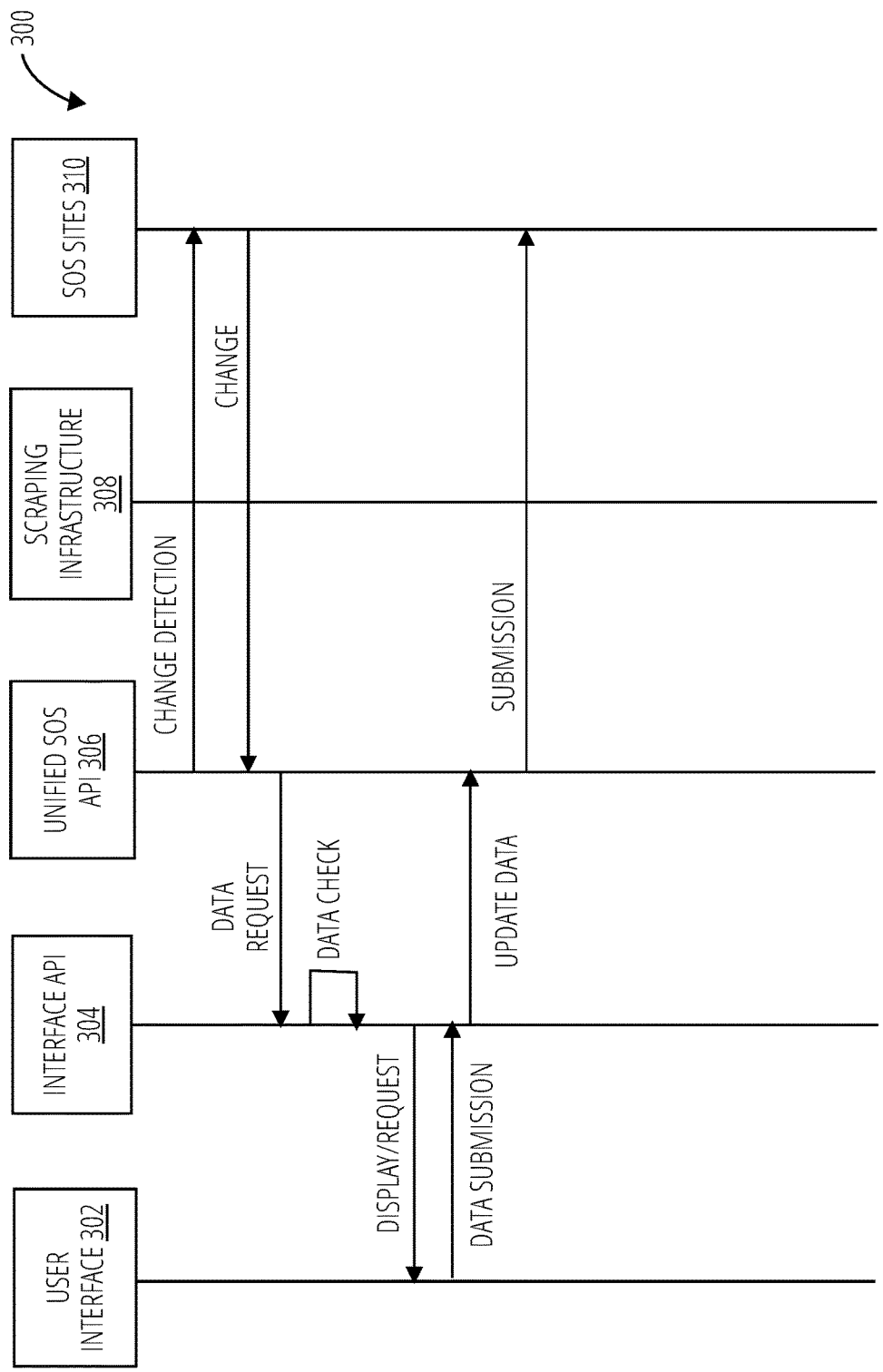
FIG. 3 illustrates an embodiment of a sequence for a change detection 300.

Referring to FIG. 3, an exemplary sequence for a change detection 300 comprises a user interface 302, an interface API 304, a unified SOS API 306, a scraping infrastructure 308, and an SOS sites 310.

The unified SOS API 306 sends a change detection signal to the SOS sites 310. The unified SOS API 306 may utilize probe logic to send and interpret the change detection signal, and the change signal from the SOS sites 310. The unified SOS API 306 may determine that the access mechanism has changed, including that additional data is requested. A data request is then sent to the interface API 304. The interface API 304 may determine that the requested data is stored in a control memory structure, or the interface API 304 may send a request to the user interface 302, which may configure the user interface 302 to receive the requested data via an input to the user interface 302. The updated data is sent to the unified SOS API 306, which may then transform the data into the access protocol, as the data may be a portion of the access protocol. The data, either previously stored or input, is thus adapted into the access protocol. The unified SOS API 306 may utilize an update transformation based on the change to the access mechanism of the SOS sites 310. The unified SOS API 306 then sends an access protocol as a submission to the web site access control ports of particular web site of the SOS sites 310. This process may be performed for multiple accounts.

Figure 4:
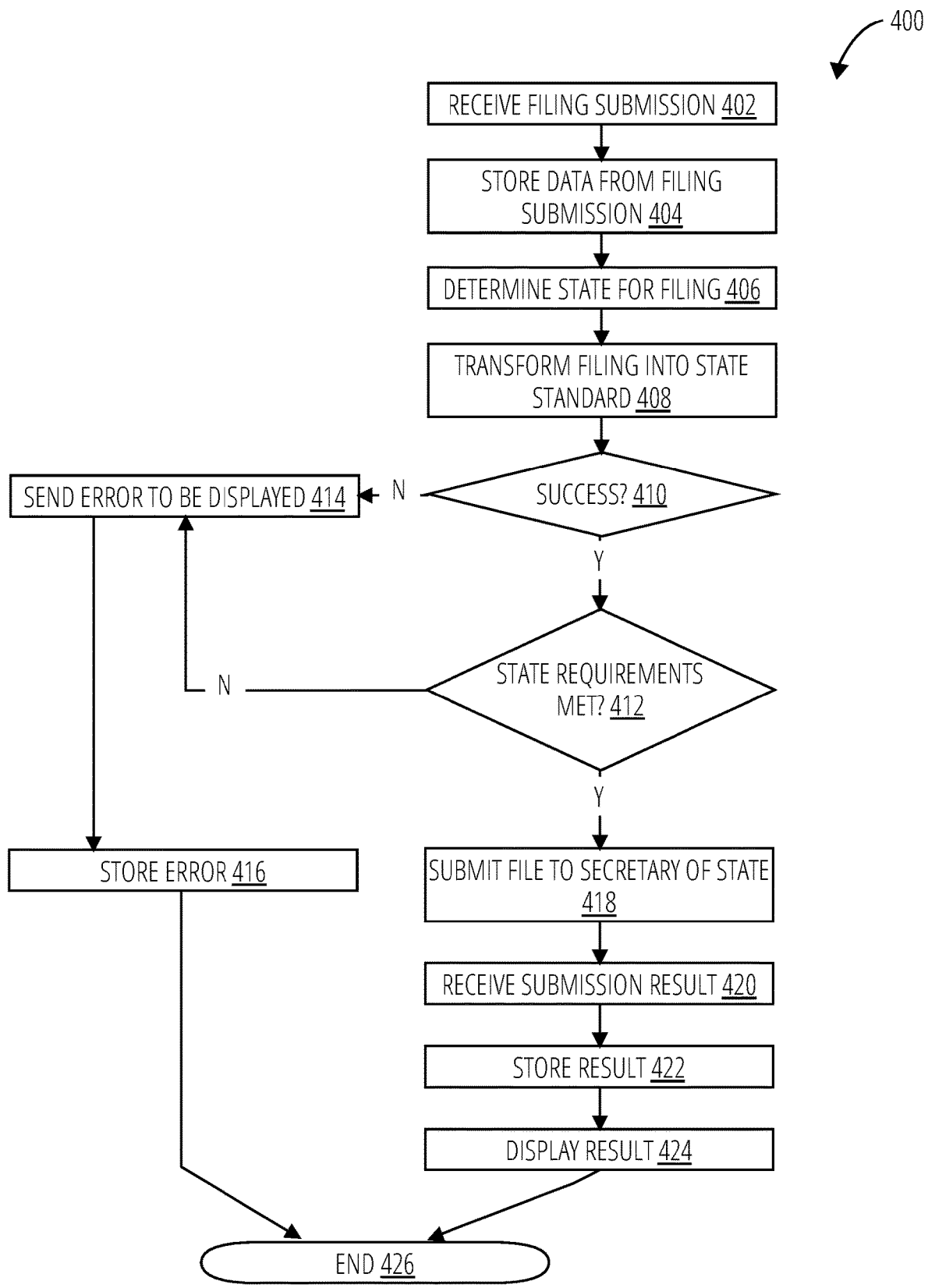
FIG. 4 illustrates an embodiment of an access operation logic method 400.

Referring to FIG. 4, an access operation logic method 400 in one embodiment receives a filing submission (block 402). The data is stored from the filing submission (block 404). The access operation logic method 400 may determine that the data has already been stored. The state for filing is then determined (block 406). The filing is transformed into the standard for the state (block 408). If the transformation is successful (decision block 410), the access operation logic method 400 determines whether the state requirements are met (decision block 412). If the transformation is not successful or the requirements are not met, an error may be display (block 414) and the error stored (block 416). The error may trigger a machine learning component to determine the required data. The display may also be configured to receive an input comprising additional information.

If the requirements are met and the transformation is successful, a file is submitted to the specific SOS (block 418). An access operation logic may be utilized to generate an access protocol for the access mechanism of the particular web site of the web site access control ports. A submission result is then received (block 420). The result is then stored (block 422) and displayed (block 424). The result may be utilized by a machine learning component to configure logic to operate a user interface to request additional data, to alter a transformation mechanism, to alter an access mechanism, etc. The access operation logic method 400 then ends (block 426).

Figure 5:
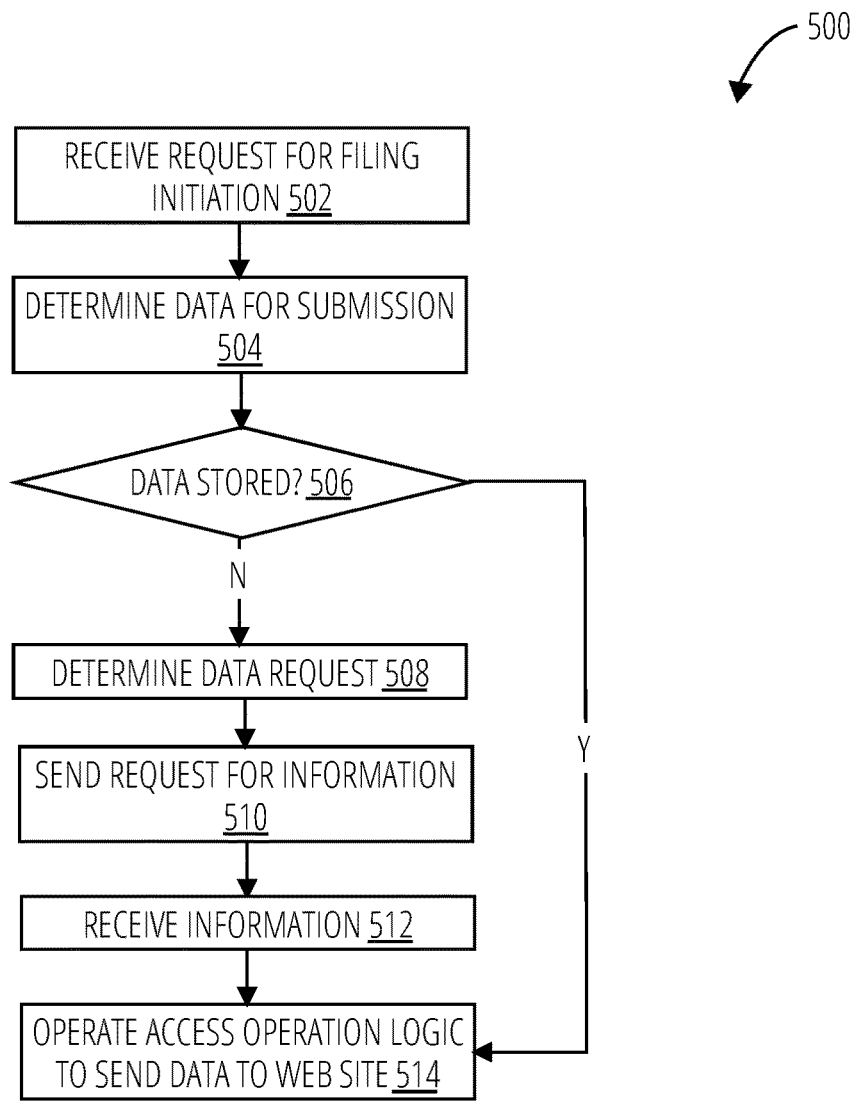
FIG. 5 illustrates an embodiment of a data request method 500.

Referring to FIG. 5, a data request method 500 in one embodiment receives a request for filing initiation (block 502). The data for submission is then determined (block 504). The data request method 500 determines whether the data for the filing is stored (decision block 506). If not, a data request is determined (block 508), which is sent to a user interface to configure that interface to receive the requested information (block 510). The information is then received (block 512). Once received, or if the determined to be present, the data request method 500 operates access operation logic to send data to the particular web site (block 514).

Figure 6:
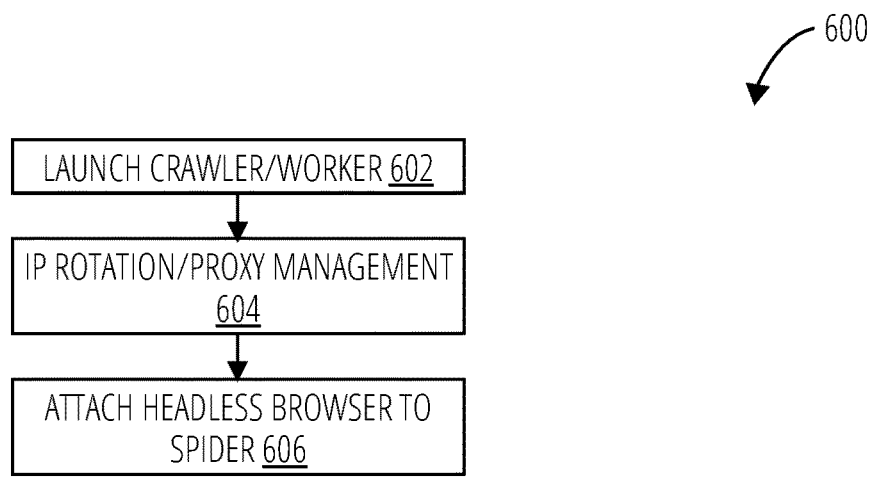
FIG. 6 illustrates an embodiment of a web site interaction method 600.

Referring to FIG. 6, a web site interaction method 600 in one embodiment launches a crawler or worker (block 602). An internet protocol rotation or proxy management is performed (block 604). A headless bowser is then attached to a spider (block 606). The access mechanism then utilizes the structure to access the web site access control ports. The web site interaction method 600 may be performed for each of the different web sites.

Figure 7:
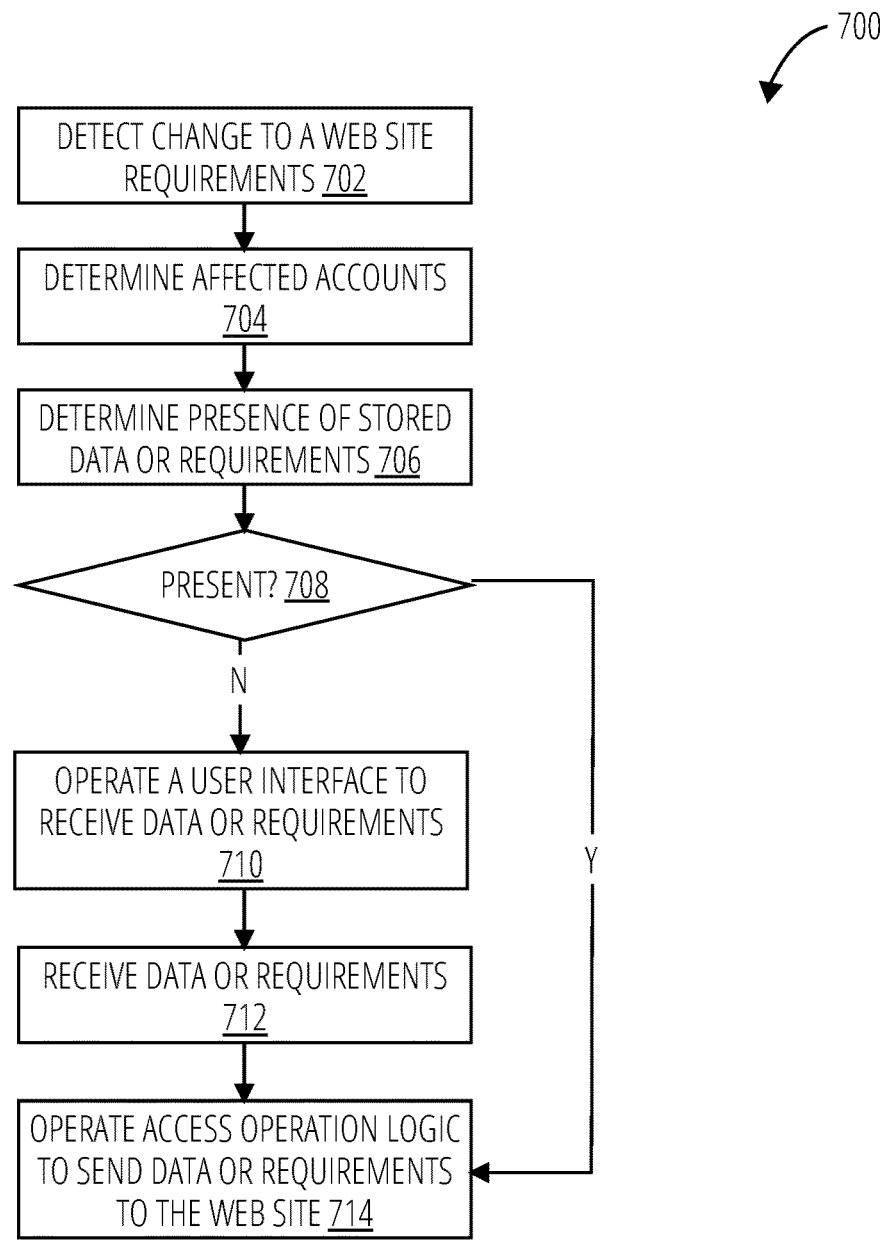
FIG. 7 illustrates an embodiment of an account update method 700.

Referring to FIG. 7, an account update method 700 in one embodiment detects a change to the web site requirements (block 702). The requirements may be web site access control ports. The accounts affect by the change are then determined (block 704). For these accounts, the presence of the stored data or requirements is determined (block 706). If they are not present (decision block 708), a user interface is operated to receive the data or requirements (block 710). A different user interface may be utilized for each account affected. The data or requirements are then received (block 712). Once received or the account update method 700 operates access operation logic to send data or requirements to the particular web site (block 714).

Figure 8:
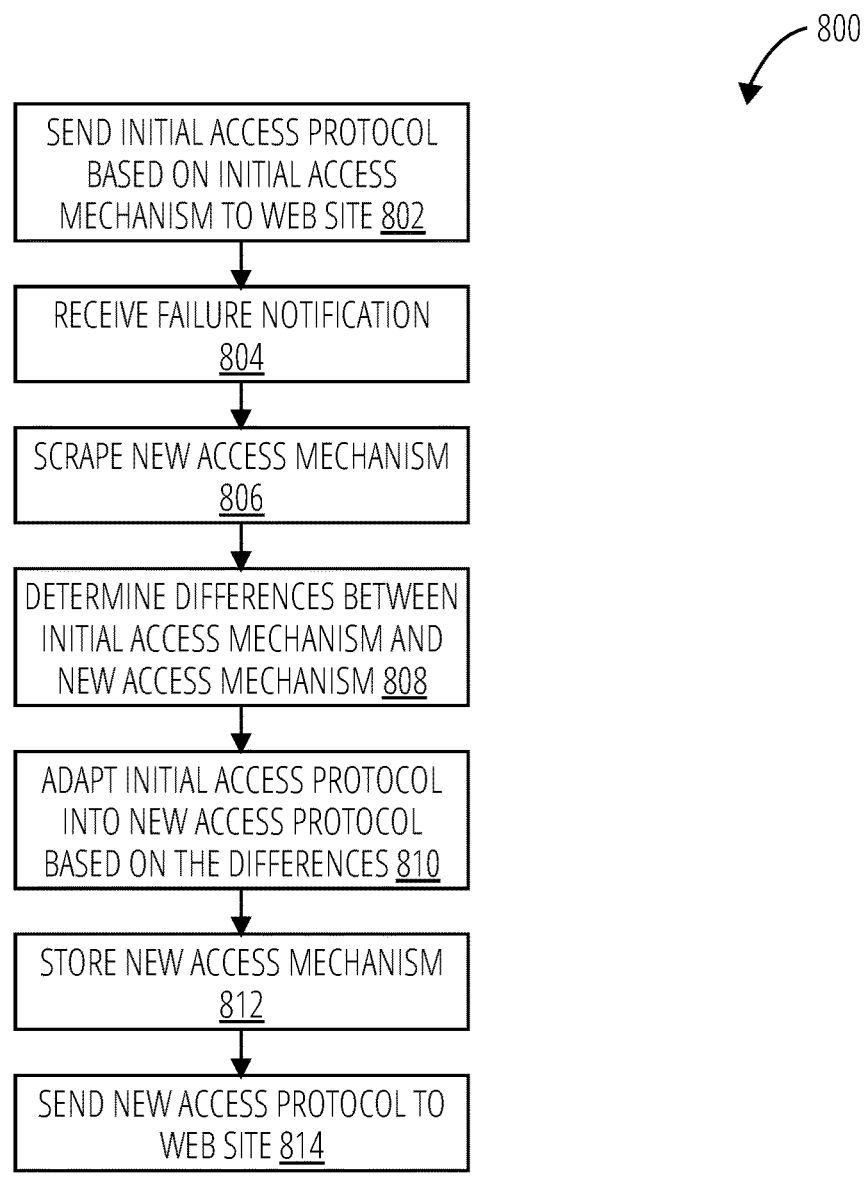
FIG. 8 illustrates an embodiment of an access protocol alteration method 800.

Referring to FIG. 8, an access protocol alteration method 800 in one embodiment sends an initial access protocol based on initial access mechanism to a web site (block 802). A failure notification is received (block 804). The new access mechanism is scraped from the web site (block 806). The new access mechanism may be determined from the markup language. The differences between initial access mechanism and new access mechanism are determined (block 808). Differences may include additional fields, removal of fields, shifting of fields, altering specific formats, etc. The initial access protocol is adapted into new access protocol based on the differences (block 810). The new access mechanism is stored (block 812). The new access protocol is sent to the web site (block 814). The access protocol alteration method 800 may determine whether other accounts are affected by the alteration to the access mechanism and send access protocols in response.

Figure 9:
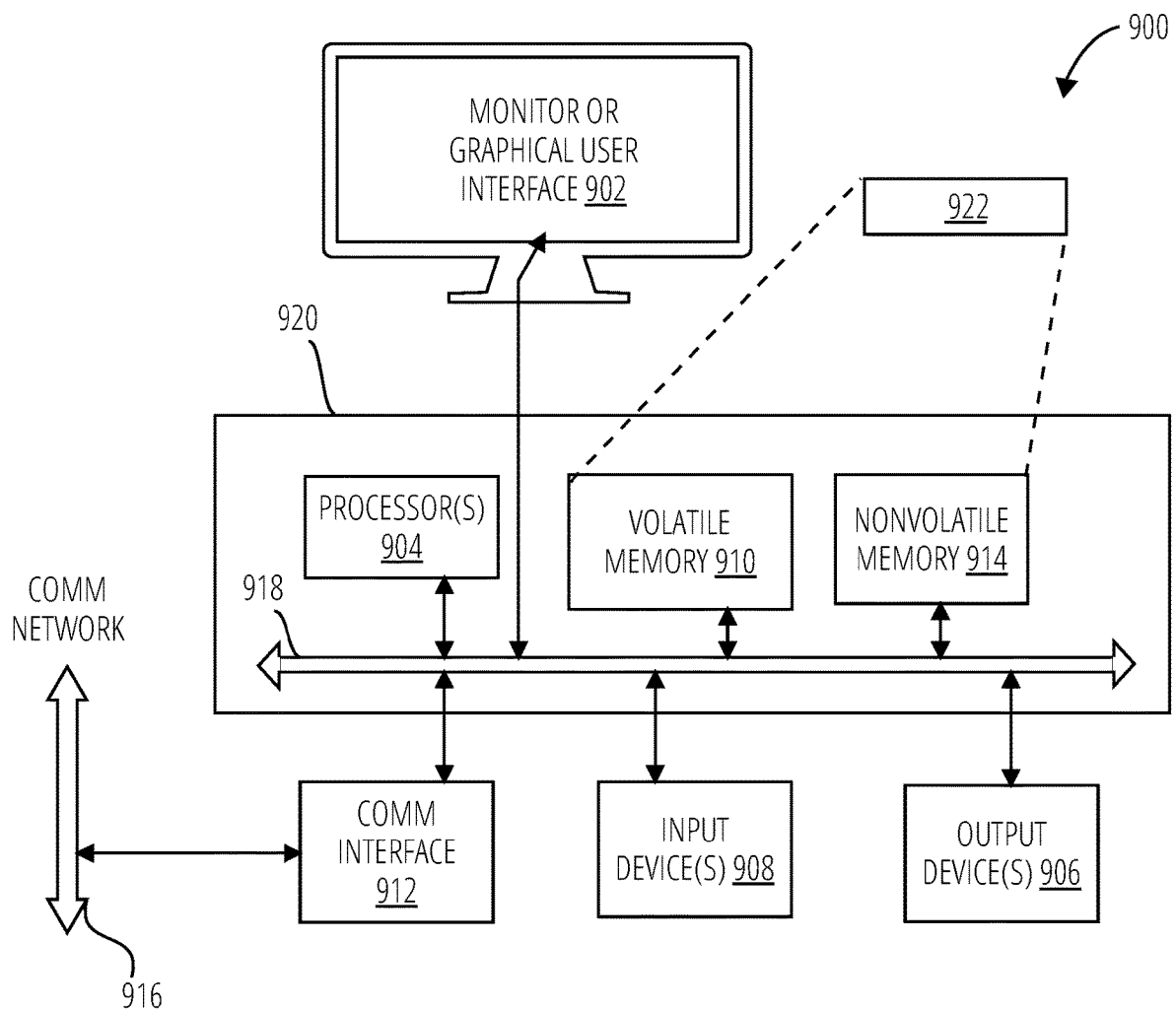
FIG. 9 is an example block diagram of a computing device 900 that may incorporate embodiments of the present invention.

FIG. 9 is an example block diagram of a computing device 900 (or computing apparatus) that may incorporate embodiments of the present invention. FIG. 9 is merely illustrative of a machine system to carry out aspects of the technical processes described herein, and does not limit the scope of the claims. One of ordinary skill in the art would recognize other variations, modifications, and alternatives. In one embodiment, the computing device 900 typically includes a monitor or graphical user interface 902, a data processing system 920, a communication network interface 912, input device(s) 908, output device(s) 906, and the like.

As depicted in FIG. 9, the data processing system 920 may include one or more processor(s) 904 that communicate with a number of peripheral devices via a bus subsystem 918. These peripheral devices may include input device(s) 908, output device(s) 906, communication network interface 912, and a storage subsystem, such as a volatile memory 910 and a nonvolatile memory 914.

The volatile memory 910 and/or the nonvolatile memory 914 may store computer-executable instructions and thus forming logic 922 that when applied to and executed by the processor(s) 904 implement embodiments of the processes disclosed herein.

The input device(s) 908 include devices and mechanisms for inputting information to the data processing system 920. These may include a keyboard, a keypad, a touch screen incorporated into the monitor or graphical user interface 902, audio input devices such as voice recognition systems, microphones, and other types of input devices. In various embodiments, the input device(s) 908 may be embodied as a computer mouse, a trackball, a track pad, a joystick, wireless remote, drawing tablet, voice command system, eye tracking system, and the like. The input device(s) 908 typically allow a user to select objects, icons, control areas, text and the like that appear on the monitor or graphical user interface 902 via a command such as a click of a button or the like.

The output device(s) 906 include devices and mechanisms for outputting information from the data processing system 920. These may include the monitor or graphical user interface 902, speakers, printers, infrared LEDs, and so on as well understood in the art.

The communication network interface 912 provides an interface to communication networks (e.g., communication network 916) and devices external to the data processing system 920. The communication network interface 912 may serve as an interface for receiving data from and transmitting data to other systems. Embodiments of the communication network interface 912 may include an Ethernet interface, a modem (telephone, satellite, cable, ISDN), (asynchronous) digital subscriber line (DSL), FireWire, USB, a wireless communication interface such as Blueooth or Wi-Fi, a near field communication wireless interface, a cellular interface, and the like.

The communication network interface 912 may be coupled to the communication network 916 via an antenna, a cable, or the like. In some embodiments, the communication network interface 912 may be physically integrated on a circuit board of the data processing system 920, or in some cases may be implemented in software or firmware, such as "soft modems", or the like.

The computing device 900 may include logic that enables communications over a network using protocols such as HTTP, TCP/IP, RTP/RTSP, IPX, UDP and the like.

The volatile memory 910 and the nonvolatile memory 914 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 910 and the nonvolatile memory 914 may be configured to store the basic programming and data constructs that provide the functionality of the disclosed processes and other embodiments thereof that fall within the scope of the present invention.

Logic 922 that implements embodiments of the present invention may be stored in the volatile memory 910 and/or the nonvolatile memory 914. Said logic 922 may be read from the volatile memory 910 and/or nonvolatile memory 914 and executed by the processor(s) 904. The volatile memory 910 and the nonvolatile memory 914 may also provide a repository for storing data used by the logic 922.

The volatile memory 910 and the nonvolatile memory 914 may include a number of memories including a main random-access memory (RAM) for storage of instructions and data during program execution and a read only memory (ROM) in which read-only non-transitory instructions are stored. The volatile memory 910 and the nonvolatile memory 914 may include a file storage subsystem providing persistent (non-volatile) storage for program and data files. The volatile memory 910 and the nonvolatile memory 914 may include removable storage systems, such as removable flash memory.

The bus subsystem 918 provides a mechanism for enabling the various components and subsystems of data processing system 920 communicate with each other as intended. Although the communication network interface 912 is depicted schematically as a single bus, some embodiments of the bus subsystem 918 may utilize multiple distinct busses.

It will be readily apparent to one of ordinary skill in the art that the computing device 900 may be a device such as a smartphone, a desktop computer, a laptop computer, a rack-mounted computer system, a computer server, or a tablet computer device. As commonly known in the art, the computing device 900 may be implemented as a collection of multiple networked computing devices. Further, the computing device 900 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

The various methods and system disclosed herein may be implemented using a variety of logic embodiments, as would be understood in the art.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" refers to logic implemented as processor-executable instructions in a machine memory (e.g. read/write volatile or nonvolatile memory or media).

"headless browser" refers to a web browser without a graphical user interface.

"spider" refers to an Internet bot that systematically browses the World Wide Web, typically for the purpose of Web indexing (web spidering).

"web site access control ports" refers to protocols of the application layer of the Internet protocol suite for the establishment of host-to-host connectivity.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A system comprising:
    at least one server;
    access operation logic coupled to the server and adapted to communicate signals from the server to a plurality of web site access control ports;
    each of the web site access control ports comprising an access mechanism for submitting electronic documents to the corresponding web site, wherein the access mechanism varies across different access control ports on different web sites;
    the access operation logic adapted to receive the electronic documents and an associated web site identification and to select an access protocol to apply to the access mechanism of a particular web site corresponding to the associated web site identification; and
    the server comprising probe logic adapted to identify the web site access control ports and to apply signals about the web site access control ports through a machine learning component to adapt the access protocol to the access mechanisms of the different web sites.

2. The system of claim 1, wherein the machine learning component:
    determines the access mechanisms of the different web sites;
    compares the access mechanisms to previous access mechanisms;
    determines differences between the access mechanisms and the previous access mechanisms; and
    adapts the access protocol based on the differences.

3. The system of claim 1, wherein the differences include an added structure to the access mechanisms, the access protocol adapted to provide the added structure.

4. The system of claim 1, wherein the differences include a removed structure from the access mechanisms, the access protocol adapted to remove the removed structure.

5. The system of claim 1, wherein the differences include a shifted structure of the access mechanisms, the access protocol adapted to apply the shifted structure.

6. The system of claim 1, wherein the differences include an altered specific format to a structure of the access mechanisms, the access protocol adapted to apply the altered specific format.

7. The system of claim 6, wherein the electronic documents have a standard format adapted to a specific format for the access protocol, each standard format associated with one or more specific formats, the machine learning component determining whether the altered specific format is one of the one or more specific formats and adapting the access protocol.

8. The system of claim 1, wherein the access mechanism is stored in a cache.

9. The system of claim 1, further comprising user interface logic to configure a user interface to receive an input, the input comprising a portion of the access protocol and adapted into the access protocol.

10. The system of claim 9, wherein the access operation logic operates the user interface logic when the access protocol does not operate the access mechanism.

11. The system of claim 9, wherein the input is stored as a stored input, the access operation logic selecting the stored input when the access protocol does not operate the access mechanism.

12. The system of claim 1, wherein the machine learning component is adapted with clustering logic to:
    receive specific formats for structures of the access mechanisms;
    determine similar specific formats; and
    store the similar specific formats as associated specific formats.

13. The system of claim 12, wherein the machine learning component determines a standard format from the associated specific formats.

14. The system of claim 13, wherein the standard format is the specific format utilized most often.

15. The system of claim 1, wherein the access operation logic utilizes a headless browser attached to a spider to access the web site access control ports.

* * * * *